H. E. HANSON.
TRANSPLANTING DEVICE.
APPLICATION FILED JULY 6, 1921.
1,425,588. Patented Aug. 15, 1922.
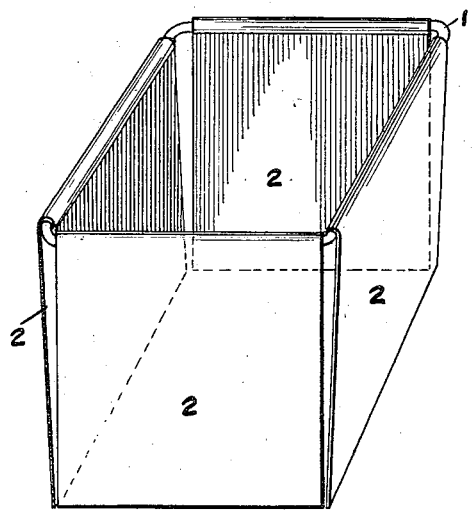
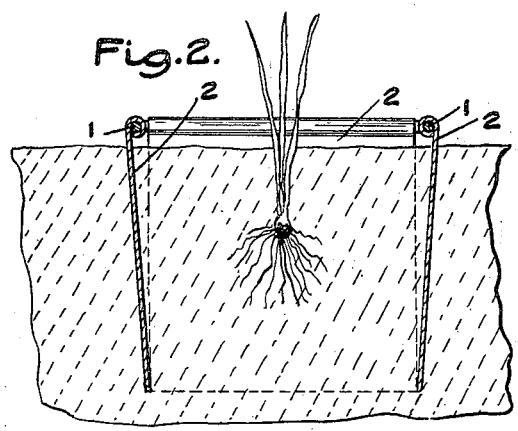
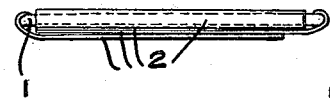
INVENTOR.
H. E. Hanson.

UNITED STATES PATENT OFFICE.

HANS E. HANSON, OF INNISFREE, ALBERTA, CANADA.

TRANSPLANTING DEVICE.

1,425,588.  Specification of Letters Patent.  Patented Aug. 15, 1922.

Application filed July 6, 1921. Serial No. 482,753.

*To all whom it may concern:*

Be it known that I, HANS E. HANSON, of the village of Innisfree, in the Province of Alberta, Canada, have invented certain new and useful Improvements in Transplanting Devices, of which the following is the specification.

My invention relates to improvements in transplanting devices and the object of the invention is to devise a device in which seeds can be grown and in which the resultant plant can be transplanted without disturbing the roots thereof. A further object is to construct a transplanting device which can be folded flat when not in use so as to occupy the minimum of space.

My invention consists of a transplanting device constructed and arranged substantially as hereinafter more particularly described and illustrated in the accompanying drawing in which:

Fig. 1 represents a perspective view of a device constructed according to my invention.

Fig. 2 is a vertical section thereof, and

Fig. 3 is an elevational view showing the same packed flat.

Like characters of reference indicate corresponding parts in the different views.

1 is a rectangular frame having the depending flaps 2 hinged thereto.

It will be understood that a number of these transplanting devices are placed in a mother box (not shown) and filled with suitable soil. Seed is then inserted into the earth in each device and when the plant has grown the required extent the device can be removed and by inserting a trowel underneath the same the resultant mold containing the plant can be withdrawn therefrom, it being understood that such mold is copiously watered so as to be exceedingly cohesive prior to this operation.

The withdrawing of the mold from the device is further facilitated by the flaps 2 being inclined inwardly in the operative position as is clearly shown in Figure 2 and the mold will consequently be of inverted truncated pyramidal shape.

The mold containing the plant can then be planted out as desired.

When the device is not in use it can be collapsed as is shown in Figure 3, thus occupying the minimum of space in the potting house.

From the above description it will be seen that I have devised a simple and effective transplanting device that will be simple and effective in use and which can be constructed at a very small cost.

What I claim as my invention is:

1. In a transplanting device, the combination with a rectangular hoop, of independent depending flaps hinged to each side of the hoop.

2. In a transplanting device, the combination with a rectangular frame, of depending flaps hinged thereto, said flaps capable of being turned inwardly to lie one above the other.

3. In a transplanting device, a plurality of flaps constituting a collapsible box with an open top and bottom.

HANS E. HANSON.